United States Patent
Laaser et al.

(10) Patent No.: US 9,213,893 B2
(45) Date of Patent: Dec. 15, 2015

(54) EXTRACTING DATA FROM SEMI-STRUCTURED ELECTRONIC DOCUMENTS

(71) Applicant: INTUIT INC., Mountain View, CA (US)

(72) Inventors: William T. Laaser, Palo Alto, CA (US); Scott D. Cook, Mountain View, CA (US); Hugh N. Molotsi, Cupertino, CA (US)

(73) Assignee: INTUIT INC., Mountain View, CA (US)

( * ) Notice: Subject to any disclaimer, the term of this patent is extended or adjusted under 35 U.S.C. 154(b) by 264 days.

(21) Appl. No.: 13/900,926

(22) Filed: May 23, 2013

(65) Prior Publication Data

US 2014/0348396 A1  Nov. 27, 2014

(51) Int. Cl.
*G06K 9/00* (2006.01)
(52) U.S. Cl.
CPC ................................. *G06K 9/00442* (2013.01)
(58) Field of Classification Search
None
See application file for complete search history.

(56) References Cited

U.S. PATENT DOCUMENTS

| | | | |
|---|---|---|---|
| 6,850,950 B1 * | 2/2005 | Clarke et al. | 1/1 |
| 7,765,236 B2 | 7/2010 | Zhai et al. | |
| 7,889,374 B2 * | 2/2011 | Wang et al. | 358/1.15 |
| 7,930,226 B1 * | 4/2011 | Quinn et al. | 705/31 |
| 2005/0289182 A1 | 12/2005 | Pandian et al. | |
| 2006/0161780 A1 * | 7/2006 | Berryman et al. | 713/176 |
| 2007/0168382 A1 | 7/2007 | Henderson et al. | |
| 2007/0245227 A1 * | 10/2007 | Hyland et al. | 715/505 |
| 2008/0040660 A1 | 2/2008 | Georke et al. | |
| 2010/0169311 A1 | 7/2010 | Tengli et al. | |
| 2011/0182500 A1 * | 7/2011 | Esposito et al. | 382/159 |
| 2012/0109792 A1 * | 5/2012 | Eftekhari et al. | 705/31 |
| 2012/0200863 A1 * | 8/2012 | Ormond | 358/1.2 |
| 2013/0128305 A1 * | 5/2013 | Grabkowitz et al. | 358/1.15 |

* cited by examiner

*Primary Examiner* — Shervin Nakhjavan
(74) *Attorney, Agent, or Firm* — Park, Vaughan, Fleming & Dowler LLP; Chia-Hsin Suen

(57) ABSTRACT

The disclosed embodiments provide a system that processes data. During operation, the system obtains a first electronic document associated with a user. Next, the system obtains one or more locations of data elements in the first electronic document from the user and uses the one or more locations to extract a first set of data from the first electronic document. Finally, the system enables, for the user, use of the first set of data with an application without requiring manual input of the first set of data into the application.

12 Claims, 6 Drawing Sheets

File Zoom Template Specification

| Intuit Bakery |
|---|

Invoice  302

To:
Bubba's Restaurant
1234 Main Street
Mountain View, CA 98765

Intuit Bakery
2700 Coast Ave
Mountain View, CA
94043

Ref #: 001001
Date: Oct 5th 2012

| Item | Description | Unit Cost | Quantity | Cost (USD) |
|---|---|---|---|---|
| Baked Goods | Bagels | $1.25 | 20 | $25.00 |
| Misc | Locks | $9.00 | 1 | $9.00 |
| Misc | Cream Cheese | $4.00 | 1 | $4.00 |

Sub Total:  $38.00
Total Amount (USD):  $38.00
Paid to Date:  $0.00
Balance:  $38.00

Payment due within 30 days of the invoice date.

---

Template: A new template

Vendor  Intuit Bakery — 304

Date  [    ]

Due Date  [    ]

Terms  [    ]

Amount  [    ]

Line Items

| Item | Description | Unit Price | Quantity | Extended Price |
|---|---|---|---|---|
|  |  |  |  |  |
|  |  |  |  |  |
|  |  |  |  |  |

[Clear]  [Accept]

EXTRACTING DATA FROM SEMI-STRUCTURED ELECTRONIC DOCUMENTS

BACKGROUND

Related Art

The disclosed embodiments relate to techniques for extracting data. More specifically, the disclosed embodiments relate to techniques for extracting data from semi-structured electronic documents.

Data processing and exchange are essential to many business and personal transactions. For example, small businesses may use accounting and/or inventory data to obtain and share reports regarding inventory sales, customer invoices, and/or cash flow. Similarly, healthcare providers may examine medical records to view patient information related to insurance providers, medical conditions, and/or office visits.

In addition, data exchange among users frequently involves the use of electronic documents such as word-processing documents, spreadsheets, and/or Portable Document Format (PDF) documents. For example, a business may manage business transactions with a set of customers by creating a set of bills, invoices, and/or other types of electronic documents containing data associated with the business transactions and transmitting the electronic documents to the respective customers via email. The customers may use the data in the electronic documents to pay the bills and/or invoices, respond to the business, and/or update their records of the transactions.

However, variations in the layouts and/or designs of electronic documents may preclude efficient extraction and/or transfer of data from the electronic documents. For example, a customer may receive electronic bills, invoices and/or other semi-structured electronic documents from a variety of businesses and/or companies. While the electronic documents may include many of the same types of data, the locations of the data may vary across electronic documents from different companies. As a result, the customer may be unable to automatically extract the data from the electronic documents into the application. Instead, the customer may be required to manually enter the data from the electronic documents into an application for managing the data (e.g., an accounting application).

Consequently, use of semi-structured electronic documents may be facilitated by mechanisms for automatically extracting data from the electronic documents.

SUMMARY

The disclosed embodiments provide a system that processes data. During operation, the system obtains a first electronic document associated with a user. Next, the system obtains one or more locations of data elements in the first electronic document from the user and uses the one or more locations to extract a first set of data from the first electronic document. Finally, the system enables, for the user, use of the first set of data with an application without requiring manual input of the first set of data into the application.

In some embodiments, the system also saves the one or more locations in a template associated with the first electronic document. Next, the system uses the template to extract a second set of data from a second electronic document. Finally, the system enables use of the second set of data with the application.

In some embodiments, the system also obtains a selection of the template for use with the second electronic document prior to extracting the second set of data from the second electronic document.

In some embodiments, obtaining the selection of the template for use with the second electronic document involves at least one of:
(i) providing a set of possible templates;
(ii) enabling selection of the template from the set of possible templates; and
(iii) enabling filtering of the set of possible templates.

In some embodiments, the set of templates is filtered based on at least one of:
(i) a type of the second electronic document;
(ii) a data element in the second electronic document;
(iii) one or more keywords;
(iv) a graphical element in the second electronic document; and
(v) a source of the second electronic document.

In some embodiments, the system also matches the template to the second electronic document prior to extracting the second set of data from the second electronic document.

In some embodiments, matching the template to the second electronic document involves at least one of:
(i) selecting the template from a set of possible templates for the second electronic document; and
(ii) reducing the set of possible templates based on a layout of the second electronic document.

In some embodiments, the second electronic document is associated with at least one of the user and one or more other users of the application.

In some embodiments, obtaining the one or more locations of data elements in the first electronic document from the user involves at least one of:
(i) obtaining a region containing a location in the first electronic document;
(ii) obtaining a subset of a table in the first electronic document as the location;
(iii) obtaining a selection of one or more characters in the first electronic document as the location; and
(iv) including adjacent characters to the one or more characters in the location.

In some embodiments, each location from the one or more locations is associated with at least one of a data type and a data element.

BRIEF DESCRIPTION OF THE FIGURES

FIG. 3A shows an exemplary screenshot in accordance with the disclosed embodiments.

FIG. 3B shows an exemplary screenshot in accordance with the disclosed embodiments.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
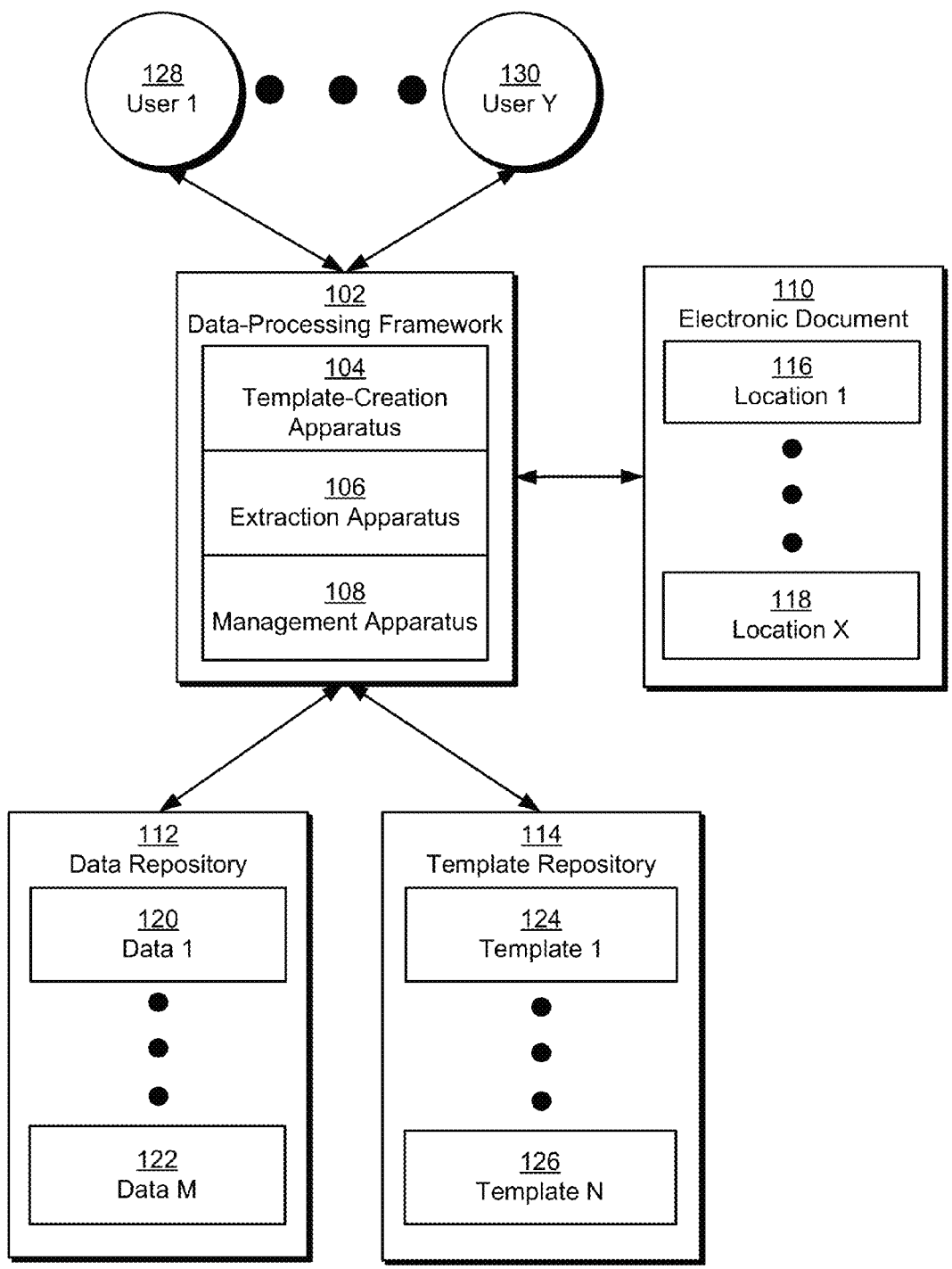
FIG. 1 shows a schematic of a system in accordance with the disclosed embodiments.

The disclosed embodiments provide a method and system for processing data. As shown in FIG. 1, the data may be included in an electronic document 110 such as a word-processing document, spreadsheet, Portable Document Format (PDF) document, web pages, and/or another type of formatted electronic document containing semi-structured data. For example, electronic document 110 may be a bill, invoice, form, statement, transcript, record, receipt, tax document (e.g., W-2, 1099-Int, 1099-Dive, consolidated brokerage statement, 1040, 1040A, 1040EZ, Schedule A, Schedule C), and/or other type of document that includes a specific type and/or set of data (e.g., data 1 120, data m 122) without adhering to a strict layout and/or format for showing the data.

The lack of common design, layout, and/or format between electronic document 110 and other semi-structured electronic documents may prevent efficient extraction and/or transfer of data from electronic document 110 to an application used to process and/or manage the data. For example, data may be automatically extracted to the application from a widely used document (e.g., a government form) after an engineering team updates the application with code that can process the document. On the other hand, custom development of data-extraction code may be unfeasible for a large number of less common documents and/or documents that frequently vary in design and/or layout. Instead, users (e.g., user 1 128, user y 130) of the electronic documents may be involved in a tedious, time-consuming, and/or error-prone process of manually entering data from the electronic documents into the application before using the data with the application.

In one or more embodiments, the system of FIG. 1 includes functionality to automatically extract data from electronic document 110 and/or other semi-structured electronic documents, despite differences in the locations (e.g., location 1 116, location x 118) of data in the electronic documents. As shown in FIG. 1, the system may correspond to a data-processing framework 102 that enables the creation of a set of templates (e.g., template 1 124, template n 126) that identify the locations of data in electronic document 110 and/or other electronic documents, as well as the use of the templates in extracting the data from the electronic document(s).

First, a template-creation apparatus 104 in data-processing framework 102 may obtain a set of locations (e.g., location 1 116, location x 118) of data in electronic document 110 from a user associated with electronic document 110. To obtain the locations from the user, template-creation apparatus 104 may provide a graphical user interface (GUI) and/or other type of user interface through which the user may specify the locations of different data elements in electronic document 110. For example, template-creation apparatus 104 may obtain electronic document 110 from the user and display an image of electronic document 110 to the user. Next, template-creation apparatus 104 may provide one or more tools and/or user-interface elements for selecting regions, characters, and/or or rows and/or columns of tables in electronic document 110 as locations of different data elements in electronic document 110. After the user has selected a given region and/or set of characters as a location, template-creation apparatus 104 may include adjacent characters to the selected characters and/or region in the location.

Template-creation apparatus 104 may also identify a data type and/or a data element associated with each user-specified location in electronic document 110. For example, template-creation apparatus 104 may obtain a selection of a data element associated with the electronic document from the user prior to obtaining the location of the data element from the user. Template-creation apparatus 104 may also restrict the data element to a certain data type (e.g., numeric, alphabetic, etc.) and/or format (e.g., currency, time, etc.). Obtaining locations of data elements in electronic documents from users is discussed in further detail below with respect to FIG. 3A.

After the user has finished specifying locations of data elements in electronic document 110, template-creation apparatus 104 may save the locations in a template associated with electronic document 110 and store the template in a template repository 114 for subsequent retrieval and/or use. Templates for electronic documents are discussed in further detail below with respect to FIG. 2.

Next, an extraction apparatus 106 in data-processing framework 102 may use the specified locations to extract a set of data (e.g., data 1 120, data m 122) from electronic document 110. For example, extraction apparatus 106 may use the template to obtain a data element from the corresponding location in electronic document 110. As with template-creation apparatus 104, extraction apparatus 106 may include characters and/or other information adjacent to data within the location in the data element. Extraction of data from electronic documents is discussed in further detail below with respect to FIG. 3B.

Finally, a management apparatus 108 in data-processing framework 102 may enable, for the user, use of the extracted data with an application without requiring manual input of the data into the application by the user. More specifically, management apparatus 108 may store the data in a data repository 112 for subsequent use with the application and/or other applications. Management apparatus 108 may additionally provide a user interface for importing the data into the application. Alternatively, management apparatus 108 may form a part of the application and allow the user to interact directly with the data. For example, management apparatus 108 may allow the user to view the data, update his/her records with the data, transmit and/or share the data with one or more other users, and/or perform other tasks associated with the data through the application.

As mentioned above, the template for electronic document 110 may be stored in template repository 114 for subsequent use. Template repository 114 may also include other templates for other types of electronic documents from one or more users (e.g., user 1 128, user y 130). As with the template for electronic document 110, the other templates may include locations of data elements in the other electronic documents, as specified by the other user(s). The templates may then be provided to extraction apparatus 106 for use in extracting data from additional electronic documents.

More specifically, extraction apparatus 106 may obtain a template that is compatible with each electronic document to be processed. The template may be selected by a user associated with the electronic document. For example, extraction apparatus 106 may provide a set of possible templates to the user using a list and/or a set of icons and/or thumbnails and enable selection of the template from the set of possible templates. To facilitate the user's identification and/or selection of the appropriate template, extraction apparatus 106 may also enable filtering of the set of templates by the user based on attributes such as template name, the type of electronic document associated with each template, creator, date created, date modified, keywords, and/or data elements in the electronic document.

Extraction apparatus 106 may also match the template to the electronic document in addition to or in lieu of obtaining the user's selection of the template. For example, extraction apparatus 106 may compare the layout of the electronic document with the locations and/or types of data elements and/or graphical elements (e.g., icons, lines, images, logos, etc.) in each template to determine a "fit" of the electronic document to the template. Extraction apparatus 106 may also match the electronic document to the template based on the source (e.g., Uniform Resource Locator (URL), directory, filename, etc.) of the electronic document. Extraction apparatus 106 may then select the template with the best fit for use in extracting data from the electronic document. Alternatively, extraction apparatus 106 may reduce the set of possible templates for the electronic document so that templates with a fit above a certain threshold are presented to the user for selection and templates that fall below the threshold are omitted from presentation to the user. Finally, if no templates are suitable for use with the electronic document, the user may create a new template for the electronic document and/or other electronic documents with the same layout and/or format, and data-processing framework 102 may use the newly created template to extract data from the electronic document(s).

By leveraging end users to provide information regarding the layouts of various electronic documents, data-processing framework 102 may enable the automatic extraction of data from the electronic documents without requiring engineering changes to the application to accommodate the layouts, designs, and/or formats of the electronic documents. The increased extraction of data from the electronic documents may further reduce overhead and/or user error associated with manually entering data from the electronic documents into the application, thus improving use of both the application and data by the user(s).

Those skilled in the art will appreciate that the system of FIG. 1 may be implemented in a variety of ways. First, template-creation apparatus 104, extraction apparatus 106, management apparatus 108, data repository 112, and template repository 114 may be provided by a single physical machine, multiple computer systems, a grid, one or more databases, one or more filesystems, and/or a cloud computing system. In addition, template-creation apparatus 104, extraction apparatus 106, and management apparatus 108 may be provided by the same hardware and/or software component or execute independently from one another. For example, template-creation apparatus 104, extraction apparatus 106, and management apparatus 108 may form a part of an application that is used to process and manage data from a set of electronic documents for a user. On the other hand, one or more components of data-processing framework 102 may execute outside the application and provide data from the electronic documents in a form that can be used by the application after extracting the data from the electronic documents.

Second, data-processing framework 102 may be configured for use with various types of electronic documents and/or data. For example, data-processing framework 102 may accept multiple types and/or file formats of electronic documents and/or include functionality to convert the electronic documents into a file format that is suitable for data extraction. Data-processing framework 102 may further obtain and/or store data in data repository 112 and/or templates in template repository 114 as relational-database records, property lists, Extensible Markup Language (XML) documents, JavaScript Object Notation (JSON) objects, and/or other types of structured data.

Figure 2:
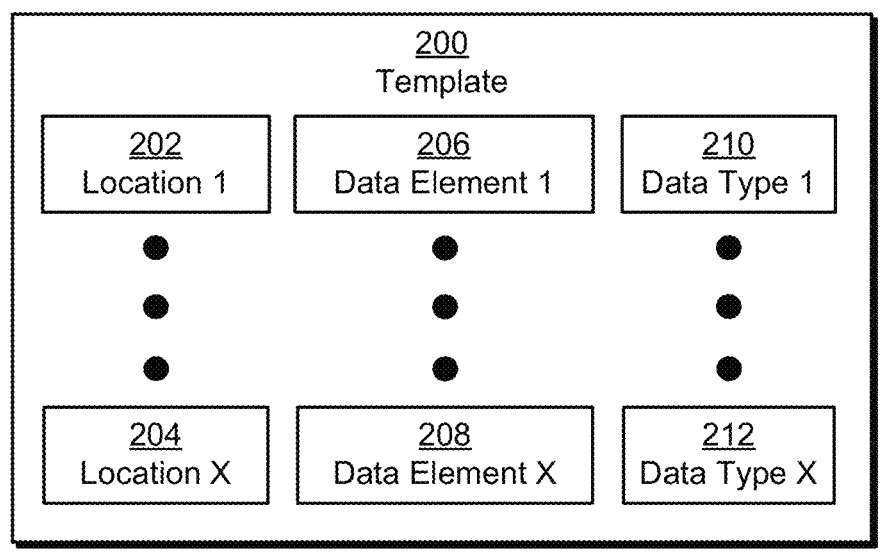
FIG. 2 shows a template for an electronic document in accordance with the disclosed embodiments.

FIG. 2 shows a template 200 for an electronic document, such as electronic document 110 of FIG. 1, in accordance with the disclosed embodiments. As described above, template 200 may be used to extract data from a semi-structured electronic document such as a form, bill, invoice, transcript, tax document, and/or receipt. As a result, template 200 may include information that defines, identifies, and/or locates the data within the electronic document.

First, template 200 may include a set of data elements (e.g., data element 1 206, data element x 208). Each data element may represent an atomic unit of information that is likely to be found in the electronic document. Alternatively, the data element may include a set of related units of information, such as information in a row and/or column of a table. The data element may also include a definition that facilitates use and/or processing of the data element. For example, a data element for a person's name may be used to identify and/or address the person, while a data element for the person's email address may be used to transmit email correspondence to the person.

Next, template 200 may include a location (e.g., location 1 202, location x 204) of each data element. The location may represent a specific region in the electronic document that contains the data element. For example, the location may correspond to a rectangular box that encloses the data element. Alternatively, the location may include one or more line numbers, table rows and/or columns, pixel locations, selected characters, and/or adjacent characters to the selected characters in the electronic document. In other words, the location may vary in size, shape, and/or boundaries.

Template 200 may further include a data type (e.g., data type 1 210, data type x 212) for each data element and/or location. The data type may specify a valid format and/or range of values for the data element. For example, a data element for a price may have a positive numeric data type, while a data element for a Social Security number (SSN) may have a data type that requires 9 numeric digits with dashes in between the third and fourth digits and the fifth and sixth digits. The data type may also specify non-text-based types of data, such as images, colors, and/or shapes. In turn, the data type may be used to determine the validity of data within the location and/or exclude characters that do not conform to the data type from the data element.

FIG. 3A shows an exemplary screenshot in accordance with the disclosed embodiments. More specifically, FIG. 3A shows a screenshot of a user interface for obtaining a location 302 of a data element 304 from an electronic document, such as electronic document 110 of FIG. 1. As shown in FIG. 3A, location 302 may be specified as a rectangular region around text (e.g., "Intuit Bakery") in the electronic document. For example, a user may provide location 302 by tapping and/or clicking on one corner of the rectangular region and dragging diagonally across the rectangular region to the opposite corner of the rectangular region before releasing the tap and/or click. Location 302 may also be expanded to include text that overlaps with and/or is adjacent to the rectangular region.

In addition, location 302 may be associated with a data element (e.g., "Vendor") in a template for the electronic document. For example, a user may associate location 302 with data element 304 by selecting location 302 on the left side of the user interface, then selecting data element 304 on the right side of the user interface while location 302 is still selected. The user may continue to provide locations of other data elements in the electronic document until a template for the electronic document is created. The user may then use the template to extract a set of data from the electronic document and/or other electronic documents with the same format and/or layout, as described below with respect to FIG. 3B.

Figure 3B:
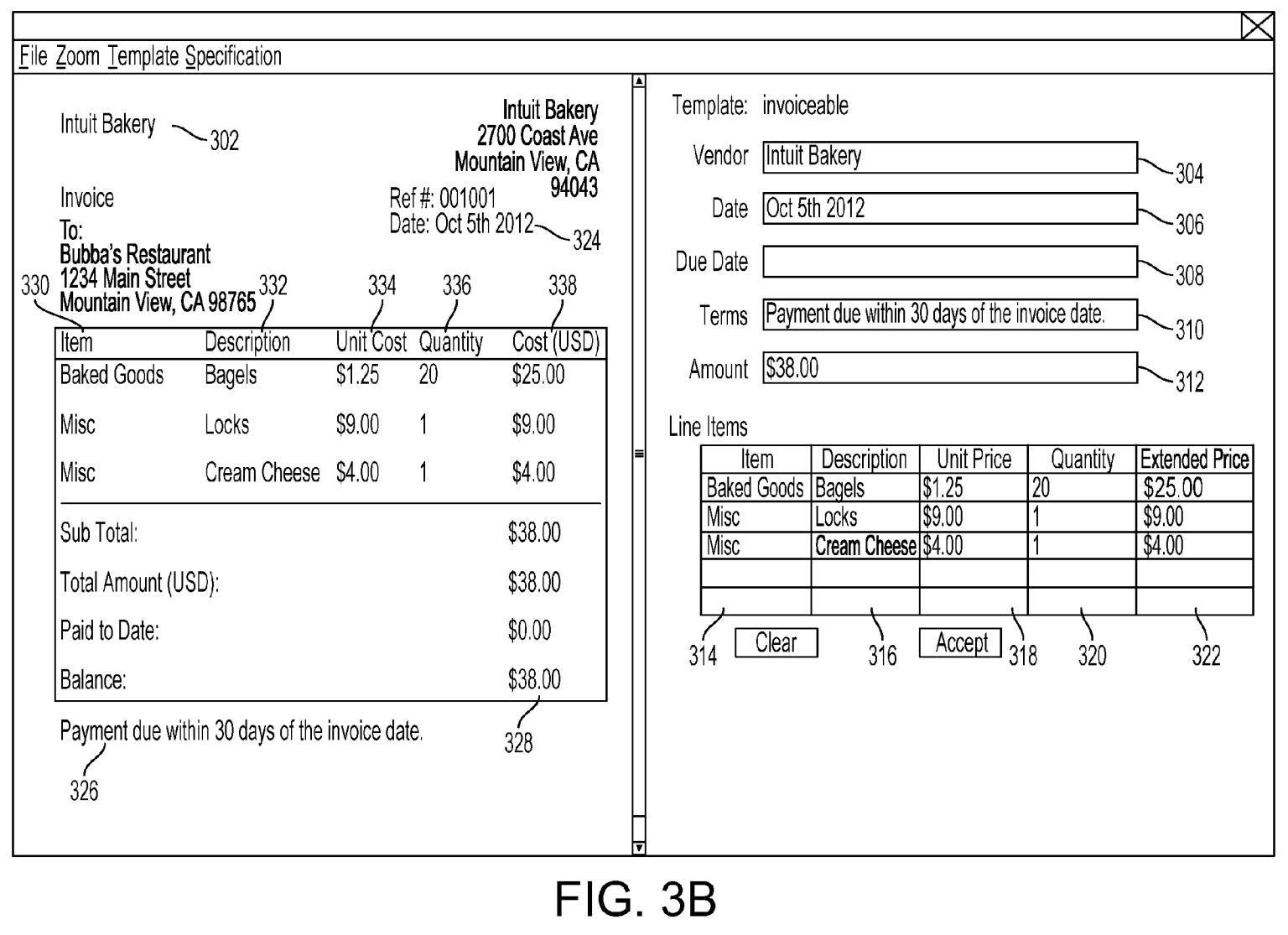

FIG. 3B shows an exemplary screenshot in accordance with the disclosed embodiments. More specifically, FIG. 3B shows a screenshot of a user interface for extracting a set of data from an electronic document, such as the electronic document of FIG. 3A. The data may be extracted using a previously created template named "invoiceable." For example, the "invoiceable" template of FIG. 3B may be created after locations of relevant data elements associated with the template are obtained from the electronic document and/or a similarly formatted electronic document using the user interface of FIG. 3A.

As shown in FIG. 3B, the template includes a set of data elements 304-322 containing data from various locations 302 and 324-338 in the electronic document. Data element 304 (e.g., "Vendor") is populated with data (e.g., "Intuit Bakery") from location 302 specified in FIG. 3A, and data element 306 (e.g., "Date") contains data (e.g., "Oct. 5, 2012") from location 324 in the electronic document. Data element 308 (e.g., "Due Date") is empty because no location for data element 308 is specified in the template and/or data for data element 308 is not provided in the electronic document. Data element 310 (e.g., "Terms") includes data (e.g., "Payment due within 30 days of the invoice date") from location 326, and data element 312 (e.g., "Amount") includes data (e.g., "$38.00") from location 328. Finally, data elements 314-322 (e.g., "Item," "Description," "Unit Price," "Quantity," "Extended Price") include data from table columns corresponding to locations 330-338, respectively.

As mentioned above, data elements 304-322 may be populated using data from the electronic document without requiring manual input of the data into fields next to data elements 304-322. In turn, the template may reduce time, effort, and/or error associated with manual entry of data into data elements 304-322. The extracted data may then be used with an application to perform one or more tasks for the user. For example, data in data elements 304-322 may be used to pay an invoice corresponding to the electronic document, update the user's accounting records, and/or facilitate a transaction between the user and the sender of the invoice.

Figure 4:
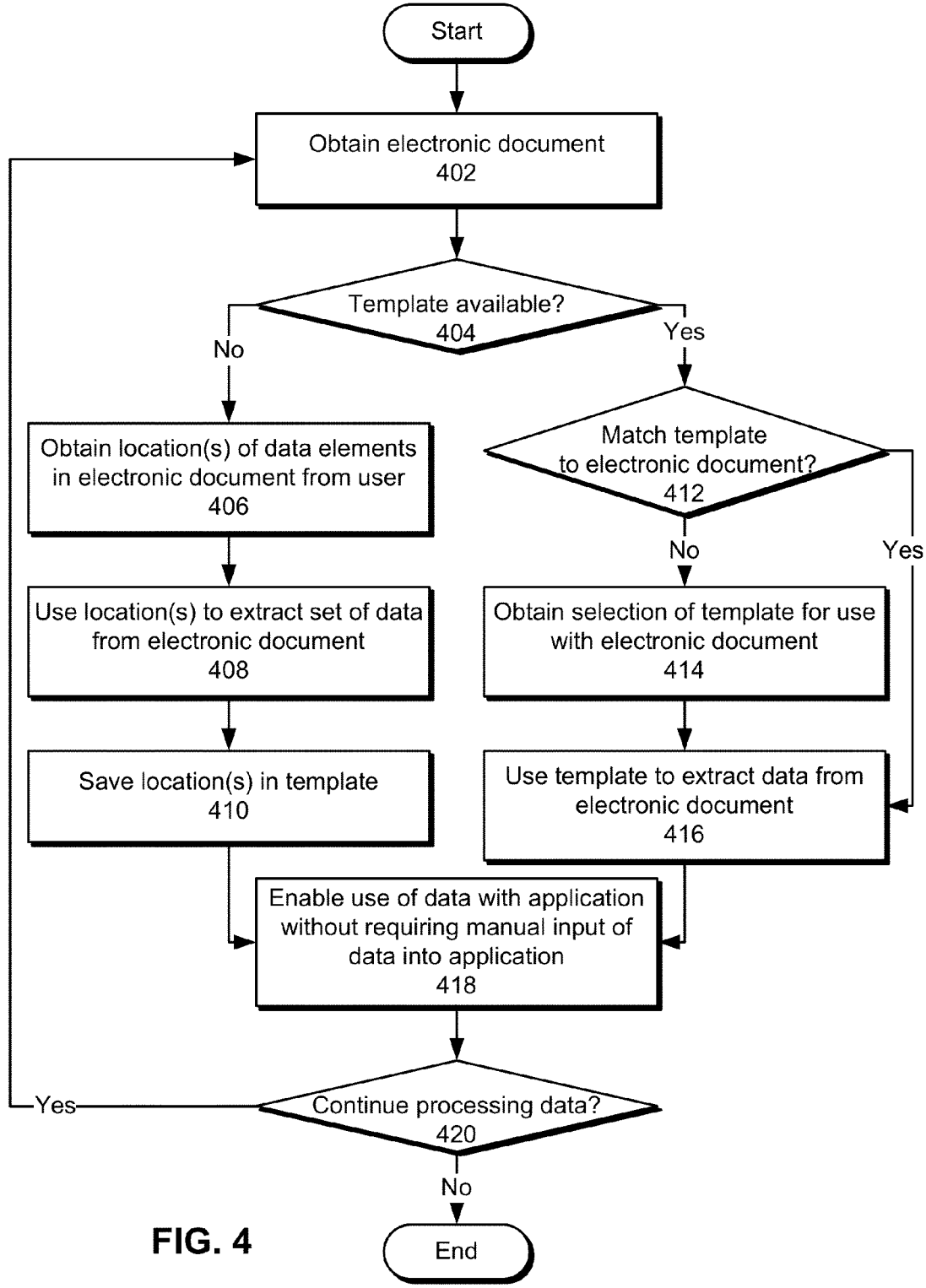
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, an electronic document is obtained (operation 402). The electronic document may be a bill, invoice, statement, transcript, receipt, and/or other semi-structured electronic document associated with a user. The electronic document may be obtained as a word-processing document, spreadsheet, web page, PDF document, and/or other type of formatted document. In addition, a template may be available for the electronic document (operation 404). For example, the template may be previously created by the user and/or another user and allow data to be extracted from the electronic document, thus averting manual entry of the data into an application to be used with the data.

If no template is available, a new template may be created by the user. First, one or more locations of data elements in the electronic document are obtained from the user (operation 406). Each location may be obtained as a region in the electronic document, a subset of a table in the electronic document, a selection of one or more characters in the electronic document, and/or adjacent characters to the character(s). Each location may also be associated with a data type and/or a data element. The data type may restrict the data in the location to a certain type and/or format of data, and the data element may define and/or identify the data to be extracted from the location.

Next, the location(s) are used to extract a set of data from the electronic document (operation 408). For example, the location(s) may be used to populate the data elements with data from the electronic document. The location(s) are also saved in a template (operation 410) for subsequent use with other electronic documents.

If a template is available for the document, the template may be matched to the electronic document (operation 412). For example, the features, data elements, graphical elements, source, and/or layout of the electronic document may be compared to the template to determine if the template fits the electronic document. If the template can be matched to the electronic document (e.g., if the template fits the electronic document well), the template is selected from a set of possible templates for the electronic document for use with the electronic document.

If the template cannot be matched to the electronic document, a selection of the template for use with the electronic document may be obtained (operation 414) from the user. For example, a set of possible templates may be provided to the user, and selection of the template from the set of possible templates may be enabled. To facilitate the user's selection, filtering of the set of possible templates by the user may also be enabled, as well as a reduction in the set of possible templates based on the "fit" of each template to the electronic document.

Once the template is selected for use with the electronic document, the template is used to extract the data from the electronic document (operation 416). Use of the extracted data with the application is then enabled without requiring manual input of data into the application (operation 418). For example, the extracted data may be displayed to the user, approved by the user, used to update the user's records, and/or used to perform one or more tasks for the user. Extraction of the data may also reduce time, effort, and/or user error associated with manually entering the data into the application. If the data is not approve by the user, the locations of the data may be provided by the user, used to extract the data from the electronic document, and saved in a template for subsequent use (operations 406-410), as described above.

Processing of data from electronic documents may continue (operation 420). For example, data may be extracted from electronic documents associated with the user and/or other users of the application during use of the electronic documents with the application by the user(s). If processing of data is to continue, additional electronic documents associated with the user(s) are obtained (operation 402), and sets of data are extracted from the electronic documents using new templates for the electronic documents (operations 404-410) and/or saved templates for the electronic documents (operations 412-416). Finally, use of the data with the application is enabled without requiring manual input of the data into the application (operation 418). Such extraction and use of data from the electronic documents may continue until the electronic documents and/or application are no longer used by the user(s).

Figure 5:
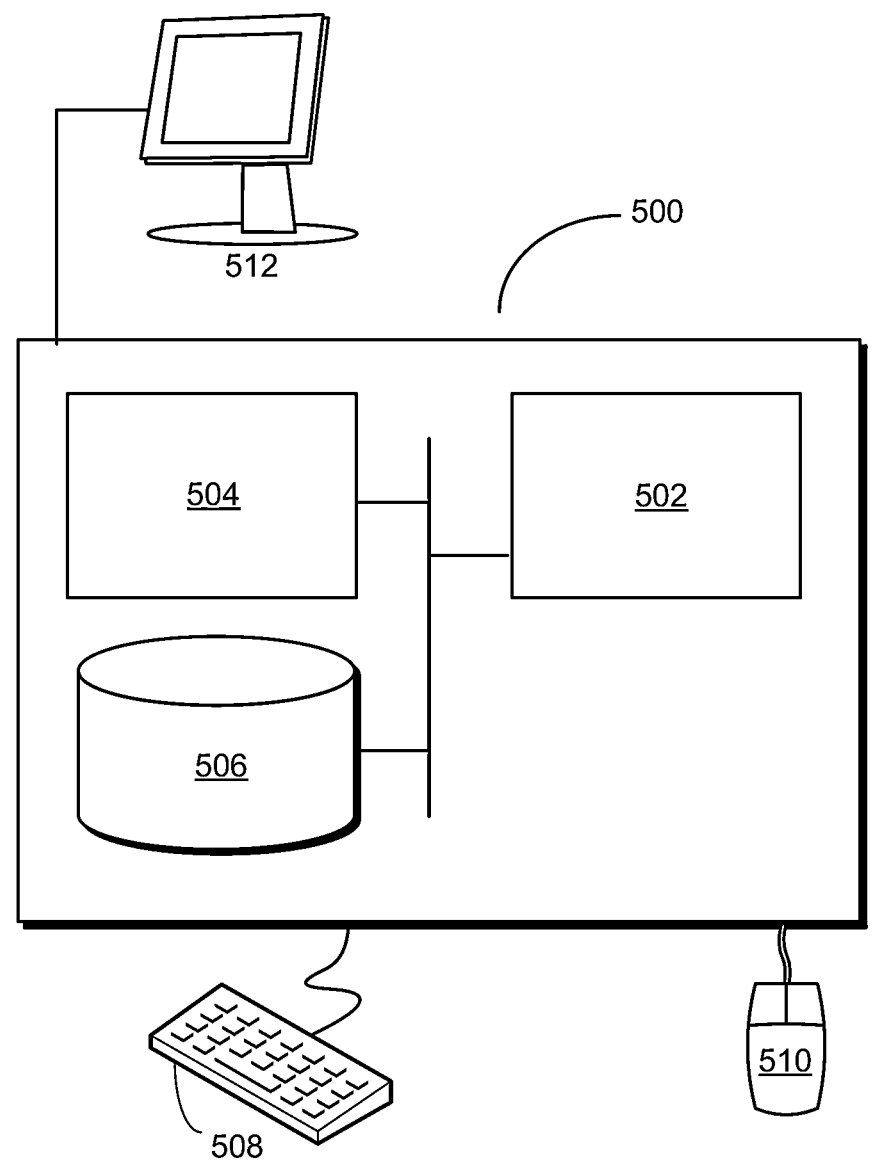
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include a template-creation apparatus that obtains a first electronic document associated with a user and one or more locations of data elements in the first electronic document from the user. The system may also include an extraction apparatus that uses the one or more locations to extract a first set of data from the first electronic document. Finally, the system may include a management apparatus that enables, for the user, use of the first set of data with an application without requiring manual input of the first set of data into the application.

The system may also enable extraction of data from other electronic documents using the locations. In particular, the template-creation apparatus may save the one or more locations in a template associated with the first electronic document. Next, the extraction apparatus may use the template to extract a second set of data from a second electronic document. Finally, the management apparatus may enable use of the second set of data with the application.

In addition, one or more components of computer system 500 may be remotely located and connected to the other components over a network. Portions of the present embodiments (e.g., template-creation apparatus, extraction apparatus, management apparatus, etc.) may also be located on different nodes of a distributed system that implements the embodiments. For example, the present embodiments may be implemented using a cloud computing system that uses a set of templates to automatically extract data from a set of electronic documents for use with an application and a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data, comprising:
    obtaining a first electronic document of a given document type from a user, the first electronic document comprising a set of fields, each field comprising data;
    performing a lookup in a template repository for a template for the given document type, wherein, for each field in the set of fields, the template identifies a location of the field in the first electronic document;
    in response to determining that a template repository does not include the template for the given document type:
        creating the template in the template repository;
        causing a graphical user interface to present an image of the first electronic document;
    for each field in the set fields:
        using the graphical user interface, receiving a selection of a region of the image from the user, wherein the selection includes the field;
        using the selection of the region to obtain the location of the field;
        using the location of the field to extract the data for the field from the first electronic document;
        storing, in the template, an identifier for the field and the location of the field;
    enabling use, for the first user, with an application, of the data for the set of fields in the first electronic document;
    obtaining a second electronic document of the given document type from a second user, the second electronic document comprising the set of fields, each field of the set of fields for the second electronic document comprising data;
    in response to determining that the template repository includes the template:
    for each field in the set of fields, using the location of the field from the template to extract data for the field from the second electronic document; and
    enabling, for the second user, use of the data for the set of fields in the second electronic document with the application without requiring manual input of the data for the set of fields in the second electronic document into the application.

2. The computer-implemented method of claim 1, wherein determining the template repository includes the template comprises filtering templates in the template repository based on at least one of:
    a type of the second electronic document;
    a data element in the second electronic document;
    one or more keywords;
    a graphical element in the second electronic document; and
    a source of the second electronic document.

3. The computer-implemented method of claim 1, further comprising:
    matching the template to the second electronic document prior to extracting the data from the second electronic document.

4. The computer-implemented method of claim 3, wherein matching the template to the second electronic document involves at least one of:
   selecting the template from a set of possible templates for the second electronic document; and
   reducing the set of possible templates based on a layout of the second electronic document.

5. The computer-implemented method of claim 1, wherein the second electronic document is associated with at least one of:
   the user; and
   one or more other users of the application.

6. The computer-implemented method of claim 1, wherein receiving the selection of the region involves at least one of:
   obtaining a subset of a table in the first electronic document as the location;
   obtaining a selection of one or more characters in the first electronic document as the location; and
   including adjacent characters to the one or more characters in the location.

7. The computer-implemented method of claim 1, wherein each location from the locations in the first electronic document or the second electronic document is associated with at least one of:
   a data type; and
   a data element.

8. A system for processing data, comprising:
   a processor;
   memory coupled to the processor;
   a template-creation apparatus coupled to the processor and configured to:
      obtain a first electronic document of a given document type from a user, the first electronic document comprising a set of fields, each field comprising data;
      perform a lookup in a template repository for a template for the given document type, wherein, for each field in the set of fields, the template identifies a location of the field in the first electronic document;
      in response to determining that a template repository does not include the template for the given document type:
         create the template in the template repository;
         cause a graphical user interface to present an image of the first electronic document;
         for each field in the set fields:
            use the graphical user interface, receiving a selection of a region of the image from the user, wherein the selection includes the field;
            use the selection of the region to obtain the location of the field; and
            store, in the template, an identifier for the field and the location of the field;
   an extraction apparatus coupled to the processor and configured to, for each field in the set of fields, use the location of the field to extract the data for the field from the first electronic document;
   a management apparatus coupled to the processor and configured to enable use, for the first user, with an application, of the data for the set of fields in the first electronic document;
   wherein the processor is configured to:
      obtain a second electronic document of the given document type from a second user, the second electronic document comprising the set of fields, each field of the set of fields for the second electronic document comprising data; in response to determining that the template repository includes the template:
         for each field in the set of fields, use the location of the field from the template to extract data for the field from the second electronic document; and
         enable, for the second user, use of the data for the set of fields in the second electronic document with the application without requiring manual input of the data for the set of fields in the second electronic document into the application.

9. The system of claim 8, wherein the second electronic document is associated with at least one of:
   the user; and
   one or more other users of the application.

10. The system of claim 8, wherein receiving the selection of the region involves at least one of:
   obtaining a subset of a table in the first electronic document as the location;
   obtaining a selection of one or more characters in the first electronic document as the location; and
   including adjacent characters to the one or more characters in the location.

11. The system of claim 8, wherein each location from the locations in the first electronic document or the second electronic document is associated with at least one of:
   a data type; and
   a data element.

12. A non-transitory computer-readable storage medium storing instructions that when executed by a computer cause the computer to perform a method for processing data, the method comprising:
   obtaining a first electronic document of a given document type from a user, the first electronic document comprising a set of fields, each field comprising data;
   performing a lookup in a template repository for a template for the given document type, wherein, for each field in the set of fields, the template identifies a location of the field in the first electronic document;
   in response to determining that a template repository does not include the template for the given document type:
      creating the template in the template repository;
      causing a graphical user interface to present an image of the first electronic document;
   for each field in the set fields:
      using the graphical user interface, receiving a selection of a region of the image from the user, wherein the selection includes the field;
      using the selection of the region to obtain the location of the field;
      using the location of the field to extract the data for the field from the first electronic document;
      storing, in the template, an identifier for the field and the location of the field;
   enabling use, for the first user, with an application, of the data for the set of fields in the first electronic document;
   obtaining a second electronic document of the given document type from a second user, the second electronic document comprising the set of fields, each field of the set of fields for the second electronic document comprising data; in response to determining that the template repository includes the template:
   for each field in the set of fields, using the location of the field from the template to extract data for the field from the second electronic document; and
   enabling, for the second user, use of the data for the set of fields in the second electronic document with the application without requiring manual input of the data for the set of fields in the second electronic document into the application.

* * * * *